United States Patent
Dietrich

(10) Patent No.: US 11,594,996 B2
(45) Date of Patent: Feb. 28, 2023

(54) METHOD AND DEVICE FOR MAINTAINING A DETECTED ABSOLUTE POSITION OF AN ELECTRIC MOTOR OPERATING AS AN ACTUATOR DURING A CRITICAL OPERATION

(71) Applicant: Schaeffler Technologies AG & Co. KG

(72) Inventor: Markus Dietrich, Oberkirch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 775 days.

(21) Appl. No.: 16/490,452

(22) PCT Filed: Feb. 12, 2018

(86) PCT No.: PCT/DE2018/100115
§ 371 (c)(1),
(2) Date: Aug. 30, 2019

(87) PCT Pub. No.: WO2018/166553
PCT Pub. Date: Sep. 20, 2018

(65) Prior Publication Data
US 2020/0007068 A1    Jan. 2, 2020

(30) Foreign Application Priority Data
Mar. 15, 2017   (DE) .......................... 102017105543.6

(51) Int. Cl.
*H02P 29/024* (2016.01)
*H02P 1/02* (2006.01)

(52) U.S. Cl.
CPC ............ *H02P 29/025* (2013.01); *H02P 1/029* (2013.01); *H02P 2203/03* (2013.01)

(58) Field of Classification Search
CPC ..... H02P 29/025; H02P 1/029; H02P 2203/03
(Continued)

(56) References Cited

U.S. PATENT DOCUMENTS 8,789,659 B2 * 7/2014 Agirman ................ B66B 5/027
187/296
2006/0202727 A1  9/2006 Ruettiger et al.
(Continued)

FOREIGN PATENT DOCUMENTS

| | | |
|---|---|---|
| DE | 19726752 A1 | 1/1999 |
| DE | 10347359 A1 | 5/2005 |

(Continued)

OTHER PUBLICATIONS

International Search Report for Corresponding PCT/DE2018/100115.

*Primary Examiner* — Kawing Chan
(74) *Attorney, Agent, or Firm* — Davidson, Davidson & Kappel, LLC

(57) ABSTRACT

A method for maintaining a detected absolute position of an electric motor operating as an actuator during a critical operation involves the electric motor (2) being controlled by a controller (1) which is supplied with energy from an energy source. In the method, with which an absolute value sensor can be omitted, the absolute position of the electric motor (2) is measured during the operation thereof, wherein rotations of the electric motor (2) are detected. The rotations are counted, and a count value is output to a microprocessor (3) of the controller (1) in order to actuate the electric motor (2), and in the event of a critical operation, the currently detected count value is maintained by means of an independent voltage supply (7).

15 Claims, 2 Drawing Sheets

(58) Field of Classification Search
USPC .................................................. 318/400.3
See application file for complete search history.

(56) References Cited

U.S. PATENT DOCUMENTS

2009/1927471     7/2009  Finkler
2015/0167374 A1  6/2015  Symanow et al.

FOREIGN PATENT DOCUMENTS

| DE | 102014225398 A1 | 6/2015 |
| DE | 102016107928 A1 | 11/2017 |
| JP | H5079430 U | 10/1995 |
| JP | H1197997 A | 4/1999 |
| JP | 2000081910 A | 3/2000 |
| JP | 2003315099 A | 11/2003 |
| JP | 2009168814 A | 7/2009 |
| WO | WO2014049744 A1 | 4/2014 |

* cited by examiner

METHOD AND DEVICE FOR MAINTAINING A DETECTED ABSOLUTE POSITION OF AN ELECTRIC MOTOR OPERATING AS AN ACTUATOR DURING A CRITICAL OPERATION

The present disclosure relates to a method for maintaining a detected absolute position of an electric motor operating as an actuator during a critical operation, wherein the electric motor is controlled by a controller which is supplied with energy from an energy source, and a device to carry out the method.

BACKGROUND

From DE 10 2014 215 263 A1, it is known that an actuator, preferably an electric motor, is controlled by a controller, wherein the controller is connected via a current-carrying supply line to an external energy supply.

As regulating motors, electric motors of this type used as actuators have a working range of a plurality of rotations, i.e. the electric motor rotates, for example in order to move a coupling in a motor vehicle from the opened to the closed state, 35 times through 360° C. However, it is important for the control of the electric motor by the controller that the absolute position of the electric motor is known. An absolute position of this type can be detected, for example, by an absolute position sensor which is disposed opposite the electric motor. The disadvantage here is that the absolute position can be lost during a critical operation.

SUMMARY

An object of the present disclosure is to indicate a method and a device for maintaining a detected absolute position of an electric motor operating as an actuator in which the absolute position is still known, even after a critical operation.

The object is achieved by measuring the absolute position of the electric motor during the operation thereof by detecting rotations of the electric motor, wherein the rotations are counted and a count value is output to a microprocessor of the controller in order to control the electric motor, wherein, in the event of a critical operation, the currently detected count value is maintained by means of an independent voltage supply. This offers the advantage, when the controller reverts to the operating mode once more following the operating failure, that the absolute position of the electric motor is known immediately without having to be redefined. An absolute position sensor can be omitted here, thus reducing the complexity of the control circuit of the electric motor, as well as costs and installation space.

A value of the independent voltage supply is advantageously compared with a voltage threshold value, wherein the absolute position of the electric motor is re-referenced if the voltage threshold value is understepped. By means of this check, it is ensured that a reduction in the independent voltage supply which is required, in particular, to operate the sensor for the rotation measurement is maintained only until the sensor can again operate without faults. If the independent voltage supply is no longer sufficient for the operation of the sensor, said sensor is deactivated.

In one design, the independent voltage supply is compared with the voltage threshold value, wherein, if the voltage threshold value is understepped, a count value, consisting of the number of rotations before the critical operation plus the integral rotations during the critical operation is adopted as the new absolute position of the electric motor when the microprocessor resumes operation. The absolute position of the electric motor therefore no longer needs to be redetermined during the operation of the electric motor, even in the event of a short-term reset or an undervoltage on the microprocessor, thus avoiding time delays in the control of the electric motor.

In one variant, the voltage threshold value is chosen as greater than the voltage which is required to operate a sensor detecting the rotation of the electric motor. By maintaining the operating voltage of the sensor, it is ensured that the sensor always supplies reliable measurement results relating to the rotation of the electric motor.

In one embodiment, a buffer capacitor is used to implement the independent voltage supply. Since this buffer capacitor is always reliably maintained at a predefined voltage value during the normal operation of the controller, a reliable voltage supply of the sensor for measuring the rotations of the electric motor is ensured even in the event of a reset or the occurrence of an undervoltage on the microprocessor.

In order to have a secured starting point for the rotation measurement of the sensor during the operation of the electric motor, a referencing of the absolute position of the electric motor is undertaken during the commissioning of the controller before the start of a process of counting the rotations of the electric motor. Since it is important to know the absolute position in respect of the function and protection of the electric motor, the 360° position (a mechanical movement of the electric motor) must be determined, particularly for the commutation of the electric motor.

One development of the present disclosure relates to a device for maintaining a detected absolute position of an electric motor operating as an actuator during a critical operation, wherein the electric motor is connected for the control to a controller which is coupled to an energy source. In the case of a device in which a referencing, i.e. a definition of the 0° position of the electric motor, can be omitted within the operating mode of the electric motor, a sensor, preferably a rotor position sensor, is disposed opposite the electric motor to detect the rotation of the electric motor, said sensor being connected to a counting unit to define the absolute position of the electric motor assumed during the operation of the electric motor from the detected rotations, said counting unit being fed to a microprocessor of the controller, wherein the sensor and the counting unit form part of a subcircuit with an independent voltage supply. Since the voltage on the controller can drop during a critical operation, the rotation numbers determined by the sensor and the counting unit are maintained due to the independent voltage supply, so that said rotation numbers can be used by the controller when it reverts to the operating mode in order to control the electric motor.

The independent voltage supply of the subcircuit is advantageously implemented by a buffer capacitor. A buffer capacitor of this type is very simple to implement, since it is connected to an operating voltage which charges this buffer capacitor without interruption so that sufficient voltage is constantly present on the sensor and on the counting unit during normal operation, so that said sensor and counting unit can operate reliably.

In one design, the subcircuit comprises a switching device which, depending on a voltage threshold value which is compared with a current value of the independent voltage supply, deactivates the subcircuit if the voltage threshold value is understepped, wherein the microprocessor monitoring the switching device triggers a referencing of the absolute position of the electric motor. Since a reliable evaluation of the rotations by the rotor position sensor and the counting unit can no longer be guaranteed due to this deactivation, the absolute position is re-referenced in this present case during the operation of the electric motor in order to again guarantee a reliable zero position of the electric motor for the definition of the commutation.

In one variant, the microprocessor is connected to a switch which is actuated if the check on the subcircuit has indicated that the latter is deactivated. This actuation of the second switch offers the advantage that the buffer capacitor, which has lost voltage during the brief critical operation as a result of the further control of the sensor, is again fully charged and is thus available once more for operation.

BRIEF SUMMARY OF THE DRAWINGS

The present disclosure permits numerous embodiments. One of these will be explained in detail with reference to the figure shown in the drawing.

In the drawings.

DETAILED DESCRIPTION

Figure 1:
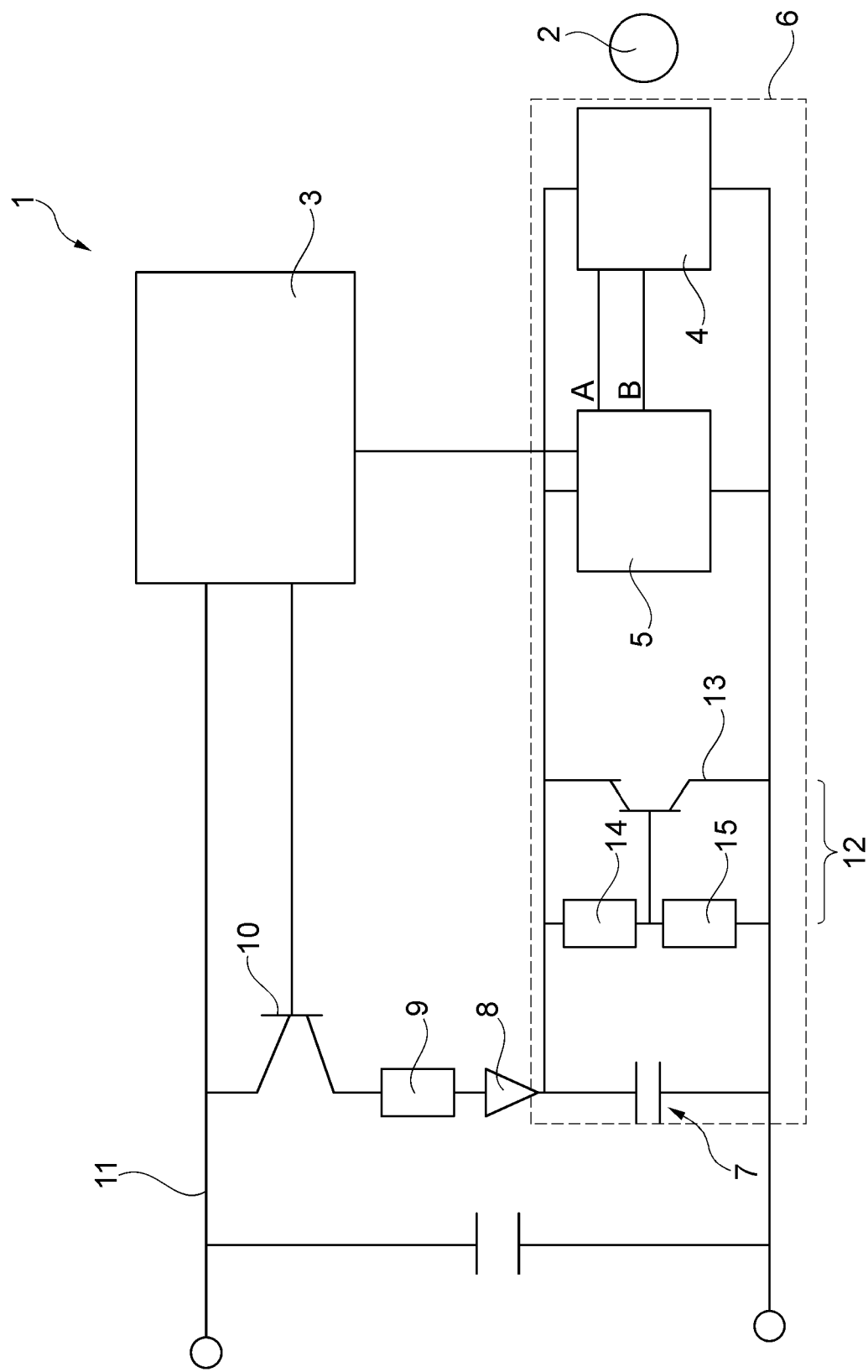
FIG. 1 shows an example embodiment of the device according to the present disclosure.

FIG. 1 presents an example embodiment of the device according to the present disclosure which shows a controller 1 which represents an actuator designed as an electric motor 2 for the control. Particularly when used in a motor vehicle, the actuator can be understood to mean a coupling actuator with one or more electric motor(s) to control the friction coupling and/or a key to control a selection and switching movement with one or more electric motor(s). For the sake of simplicity, reference is made in FIG. 1 to only one electric motor 2 which is controlled by a microprocessor 3 of the controller 1 in respect of its function, in particular in relation to a commutation, and which is represented by the rotor position magnet. A rotor position sensor 4 which is connected to a counting unit 5 is disposed opposite the electric motor 2. The counting unit 5 and the rotor position sensor 4 form part of a subcircuit 6 which has an independent energy supply in the form of a buffer capacitor 7. An independently operating subcircuit 6 of this type is thus capable of functioning independently from the remainder of the controller 1. The buffer capacitor 7 is coupled via a diode 8, a resistor 9 and a switch 10, the base of which is connected to the microprocessor 3, to a current-carrying line 11 which connects the microcontroller 3 to an external energy source 16 shown schematically in FIG. 2.

A holding circuit 12 which has a switching unit 13, the base of which is fed to a voltage divider 14, 15, is disposed within the subcircuit 6 parallel to the buffer capacitor 7, the rotor position sensor 4 and the counting unit 5. The operational readiness of the subcircuit 6 is enabled by the buffer capacitor 7. Said buffer capacitor 7 is charged by the external energy source 16 as soon as the controller 1 is supplied with voltage.

For use in the motor vehicle, the absolute position of the electric motor 2 corresponding mechanically to the 0° position which is required, in particular, in order to define the commutation of the electric motor 2 is referenced when the ignition is switched on, i.e. when the energy supply of the controller 1 begins, the motor commutation then takes place via the rotor position sensor 4, absolute to a maximum of one mechanical rotation of the electric motor 2.

Figure 2:
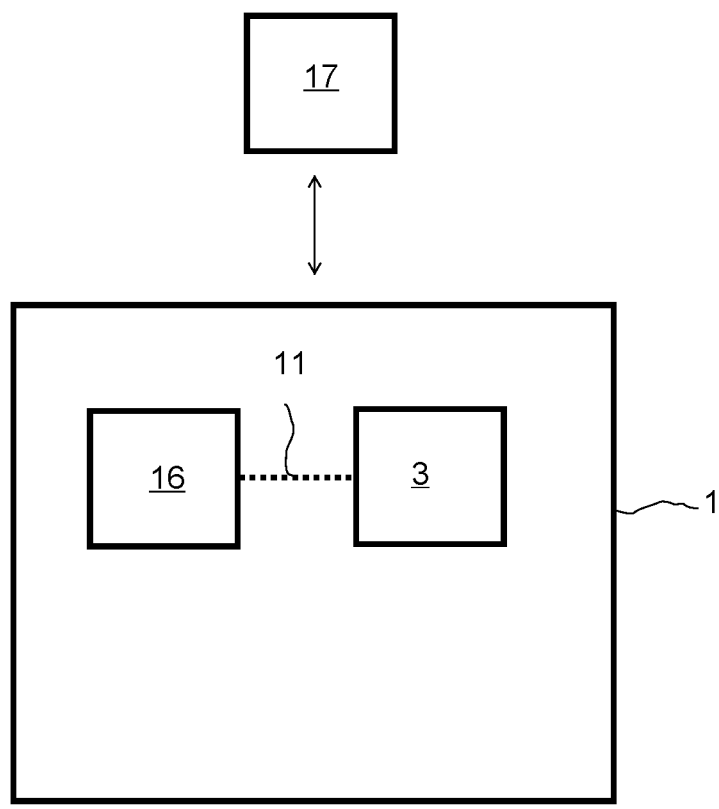
FIG. 2 schematically shows an external energy source connected to a microprocessor of the controller and a higher-level controller for triggering a reset.

If the case now occurs where the voltage of the controller 1 drops or a reset triggered by a higher-level controller 17, which is shown schematically in FIG. 2, takes place, the connection of the subcircuit 6 to the electronics as a whole is interrupted and the charge of the buffer capacitor 7 is used to supply the subcircuit 6 with energy, as a result of which a further detection of the rotations of the electric motor 2 and counting and storage of the number of rotations in the counting unit 4 become possible. The voltage applied to the base of the switching unit 13 and set by the voltage divider 14, 15 is selected as at least so high that it provides the operating voltage for the counting unit 5 and the rotor position sensor 4. It advantageously corresponds to the voltage of around 5 V provided by the buffer capacitor 7.

If the critical operation which lasts a maximum of one second only is overcome, the voltage of the buffer capacitor 7 present on the subcircuit 6 is checked by the microprocessor 3 with the holding voltage provided on the switching unit 13 and used as the threshold value. If the threshold value is not understepped, the stored rotation information which comprises the last state before the reset plus the integral rotations during the reset is adopted by the microprocessor 3 as the new absolute position of the electric motor 2. If the threshold value is understepped by the voltage of the buffer capacitor 7, the microprocessor 3 instigates a new referencing of the absolute position.

However, if it is established in this check that the voltage of the subcircuit 6 is below the voltage of the buffer capacitor 7 and the latter has therefore been deactivated, the microprocessor 3 actuates the switch 10 in order to connect the buffer capacitor 7 via the line 11 to the external energy supply 16 and thus supply it with energy once more. The buffer capacitor 7 is thereby recharged.

In order to cover longer resets or maintain the function of the electric motor 2 over a plurality of days, the buffer capacitor 7 can be charged to a much higher voltage, for example to 12 volts, in order to thus maintain the minimum voltage of the subcircuit 6 for a longer period. Alternatively, low-power sensors can also be used, the current consumption of which lies within the microampere range, in order to maintain the function of the electric motor 2 for a very long period.

The proposed solution requires a simplified magnet design for the electric motor, since only a single sensor, the rotor position sensor 4, is required. Magnet costs are thereby reduced. An additional absolute position sensor can be omitted.

REFERENCE NUMBER LIST

1 Controller
2 Electric motor
3 Microprocessor
4 Rotor position sensor
5 Counting unit
6 Subcircuit
7 Buffer capacitor
8 Diode
9 Resistor
10 Switch
11 Line
12 Holding circuit
13 Switching unit
14 Resistor
15 Resistor 16 External energy source
17 Higher level controller

What is claimed is:

1. A method for maintaining a detected absolute position of an electric motor operating as an actuator during a critical operation, the method comprising:
controlling the electric motor by a controller which is supplied with energy from an energy source;
measuring an absolute position of the electric motor during the operation of the electric motor by detecting and counting rotations of the electric motor;
outputting a counter value of the counted rotations of the electric motor to a microprocessor of the controller for controlling the electric motor;
maintaining, in the event of a critical operation, a currently detected value of the counter value by an independent voltage supply;
comparing a value of the independent voltage supply with a voltage threshold value; and
instigating a new referencing of the absolute position of the electric motor if the value of the independent voltage supply understeps the voltage threshold value.

2. The method as claimed in claim 1 wherein the voltage threshold value is selected as higher than a voltage which is required in order to operate a sensor detecting the rotations of the electric motor.

3. The method as claimed in claim 1, further comprising:
if the voltage threshold value is not understepped, adopting a count value consisting of a number of rotations before the critical operation plus integral rotations during the critical operation as a new absolute position of the electric motor when operation of the microprocessor resumes.

4. The method as claimed in claim 3 wherein the voltage threshold value is selected as higher than a voltage which is required in order to operate a sensor detecting the rotations of the electric motor.

5. The method as claimed in claim 1 wherein a buffer capacitor is used to implement the independent voltage supply.

6. The method as claimed in claim 1 further comprising referencing the absolute position of the electric motor during a commissioning of the controller before a start of a process of counting the rotations of the electric motor.

7. A device for maintaining a detected absolute position of an electric motor operating as an actuator during a critical operation, the electric motor being controlled by a controller coupled to an energy supply, the device comprising:
a sensor configured for being disposed opposite the electric motor for detecting rotations of the electric motor;
a counting unit, the sensor being connected to the counting unit to define the absolute position of the electric motor assumed during operation of the electric motor from the detected rotations, the counting unit being fed to a microprocessor of the controller, the sensor and the counting unit forming part of a subcircuit with an independent voltage supply,
wherein the subcircuit comprises a switching unit which, depending on a voltage threshold value which is compared with a current value of the independent voltage supply, switches off the subcircuit if the voltage threshold value is understepped by the current value of the independent voltage supply.

8. The device as claimed in claim 7, wherein the independent voltage supply of the subcircuit is implemented by a buffer capacitor connected to an operating voltage of the controller.

9. The device as claimed in claim 7, wherein the microprocessor monitoring the switching unit triggers a referencing of the absolute position of the electric motor.

10. The device as claimed in claim 7, wherein the microprocessor is connected to a switch which is controlled if a check of the subcircuit has indicated that the subcircuit is deactivated.

11. A subcircuit for maintaining a detected absolute position of an electric motor operating as an actuator during a critical operation, the subcircuit comprising:
a sensor configured for being disposed opposite the electric motor for detecting rotations of the electric motor;
a counting unit, the sensor being connected to the counting unit to define the absolute position of the electric motor assumed during operation of the electric motor from the detected rotations, the counting unit configured for outputting a counter value;
a voltage supply configured for being recharged by an external energy source, the sensor and the counting unit being supplied with energy from the voltage supply during a critical operation in which a voltage of a controller for controlling the electric motor drops or a reset is triggered;
a holding circuit parallel to the voltage supply configured to provide an operating voltage for the counting unit and the sensor during the critical operation; and
wherein the holding circuit includes a switching unit and a voltage divider, a voltage applied to a base of the switching unit and set by the voltage divider being selected to provide the operating voltage for the counting unit and the sensor during the critical operation.

12. The subcircuit as recited in claim 11 wherein the voltage supply is a buffer capacitor.

13. A system comprising:
the subcircuit as recited in claim 11; and
a microprocessor, the counting unit configured for outputting a counter value to the microprocessor.

14. The system as recited in claim 13 wherein the microprocessor is configured for checking a voltage present on the subcircuit with a threshold value following the critical operation.

15. The system as recited in claim 13 further comprising a switch coupling the voltage supply with the external energy source, the microprocessor configured to actuate the switch in order to connect the voltage supply to the external energy source.

* * * * *